United States Patent
Carter

[11] 3,759,553
[45] Sept. 18, 1973

[54] PIPE COUPLINGS
[75] Inventor: Raymond Charles Carter, Sheffield, England
[73] Assignee: Hepworth Plastics Limited, Sheffield, England
[22] Filed: Mar. 23, 1972
[21] Appl. No.: 237,358

[30] Foreign Application Priority Data
Apr. 21, 1971 Great Britain.................. 10,591/71

[52] U.S. Cl.................. 285/260, 285/305, 285/423
[51] Int. Cl............................................ F16l 31/00
[58] Field of Search.................... 285/423, 260, 305, 285/381

[56] References Cited
UNITED STATES PATENTS
| | | | |
|---|---|---|---|
| 3,606,402 | 9/1971 | Medney | 285/305 X |
| 3,260,540 | 7/1966 | Houot | 285/423 X |
| 3,001,673 | 9/1961 | Brown | 285/423 X |

FOREIGN PATENTS OR APPLICATIONS
| | | | |
|---|---|---|---|
| 1,097,192 | 12/1967 | Great Britain | 285/305 |
| 401,607 | 5/1966 | Switzerland | 285/305 |
| 533,751 | 2/1941 | Great Britain | 285/347 |

Primary Examiner—Dave W. Arola
Attorney—Lowe and King

[57] ABSTRACT

A socket and spigot pipe coupling for plastics pipes is especially adapted to withstand a pull such as is experienced in the mole-ploughing of pipe-lines into the ground by providing additional plastics material to increase the wall thicknesses to accommodate mating circumferential grooves for at least one flexible thrust rod to lock the pipes together and which rod is inserted through a hole in the socket tangential to the groove, the additional plastics material being provided by a collar secured on the outside of the socket and a sleeve secured inside the spigot which has been expanded so as to be a close sliding fit in the socket, the hole for insertion of the flexible thrust rod being provided through the collar as well as the socket.

5 Claims, 4 Drawing Figures

PIPE COUPLINGS

This invention relates to pipe couplings, more particularly for socketed and spigoted plastics pipes and of the type in which the socketed and spigoted pipe-ends are provided with additional plastics material to increase the wall thicknesses to accommodate grooves for at least one flexible thrust rod to lock the pipes together and which rod is inserted through a hole tangential to the grooves.

The object of the invention is to provide a pipe coupling of the type referred to in which the transmission of axial loads from one pipe to another, as experienced when mole-ploughing the pipes into the ground, is not dependent upon the secureness of the attachment of the additional material to the pipe-ends.

According to the present invention, a pipe coupling of the type referred to comprises a collar secured on the outside of the socketed pipe-ends to provide the additional plastics material, a sleeve to provide the additional plastics material secured inside the spigoted pipe-end which has been expanded so as to be a close sliding fit in the socketed pipe-end, a circumferential groove in the outside of the spigoted pipe-end or in the inside of the socketed pipe-end and housing a resilient sealing ring for sealing engagement with the socketed pipe-end or the spigoted pipe-end, as the case may be, at least one circumferential groove in the outside of the spigoted pipe-end, a corresponding circumferential groove in the inside of the socketed pipe-end, a flexible rod of a section fitting the section formed by the aforesaid pair of corresponding grooves, and a hole of similar section through the collar and the socketed pipe-end tangentially into the groove in the socketed pipe-end, for insertion of the flexible rod into the groove in the socketed pipe-end when aligned with the groove in the spigoted pipe-end, to complete the coupling of the pipes.

A pull on one pipe is transmitted through the rod in the grooves in the pipe-ends to the other pipe, and thus the transmission of axial loads from one pipe to the other, as experienced when mole-ploughing the pipes into the ground, is not dependent upon the secureness of the collar and/or the sleeve, which makes it possible to apply a pull through the coupling without having to wait for any adhesive or solvent cement welding between the respective pipe-ends and the collar and sleeve to set.

However, the collar and sleeve are preferably secured by shrink fitting the collar on to the socketed pipe-end and the spigoted pipe-end on to the sleeve, i.e., making use of the "memory" that the expanded plastics pipe material has of its original diameter, so that the use of adhesive or solvent cement welding is unnecessary. The ultimate end of the spigoted pipe-end may be turned in over the adjacent end of the sleeve (which may be bevelled externally; and the other end of the sleeve is preferably similarly bevelled, so that the sleeve can be inserted — before shrinking the spigoted pipe-end — either way round), so as to increase the secureness of the sleeve and/or to provide a lead-in taper on the spigoted pipe-end; but, in any case, the ultimate end of the socketed pipe-end is preferably bevelled internally to provide a lead-in for the spigoted pipe-end.

The flexible thrust rod may be of circular section, the grooves in the pipe-ends preferably having a corresponding substantially semi-circular section. The rod may be of a length just sufficient to encircle the spigoted pipe-end, or it may be of a length to fill the hole in the socketed pipe-end and the collar when fully inserted into the aligned grooves in the socketed and spigoted pipe-ends even to requiring that excess be trimmed off flush with the outside of the collar. Suitable materials for the thrust rod are polyvinylchloride, polyethylene, polypropylene, or nylon. Suitable materials for the pipes, collar and sleeve are polyvinylchloride and polypropylene.

Increased axial load carrying capacity, especially with the larger sections of pipe, can be afforded by providing additional mating grooves in the pipe-ends for receiving an additional thrust rod, without necessarily requiring a greater thickness for the collar and sleeve. The holes in the collar and socketed pipe-end for insertion of the rods may be staggered so as to avoid setting up any pronounced line of stress along the collar and socketed pipe-end.

The sealing ring may be an O-ring, or it may be elongated axially and formed with a plurality of ribs or lips inside and outside to afford a correspondind number of seals. The sealing ring may be made of rubber or any other suitable elastomeric material.

The inside of the socketed pipe-end and the flexible thrust rod or rods may be lubricated, e.g., by castor oil, to assist fitting of the spigoted pipe-end in the socketed pipe-end and insertion of the thrust rod or rods.

Three embodiments of the invention will now be described, by way of example only, with reference to the accompanying drawings, in which.

Figure 1:
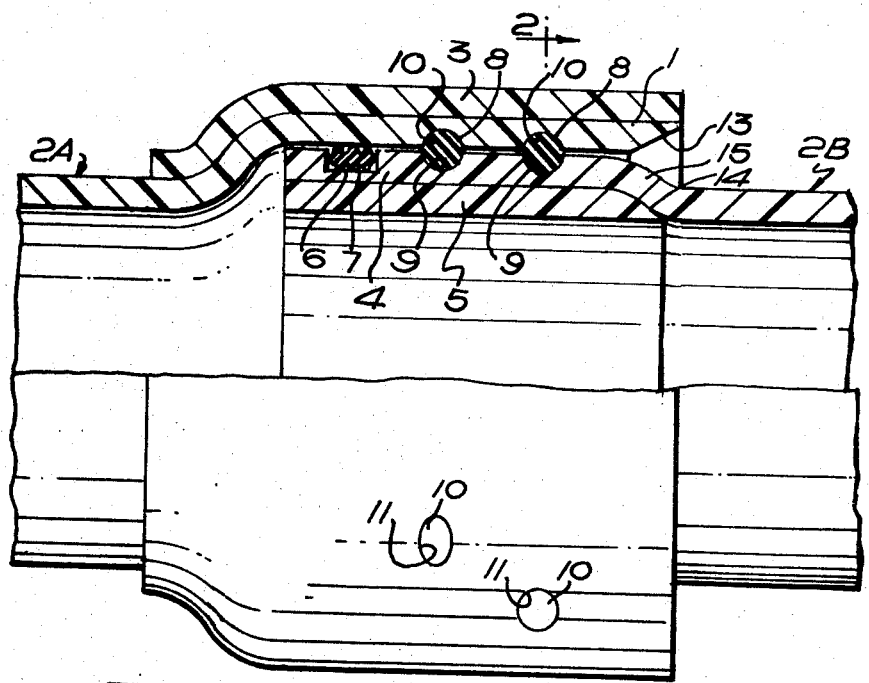
FIG. 1 is a half-sectional elevation of one form of pipe coupling according to the invention.
Figure 3:
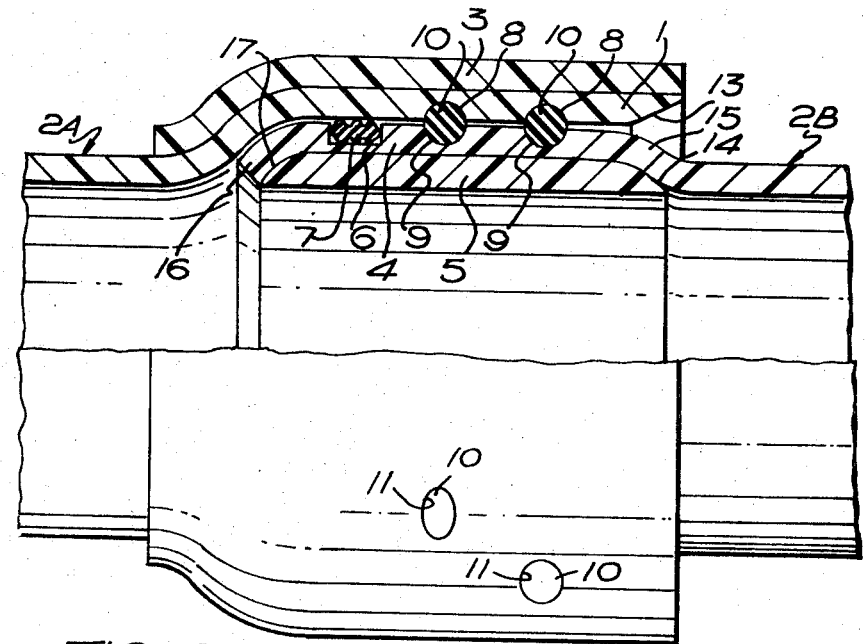
Figure 4:
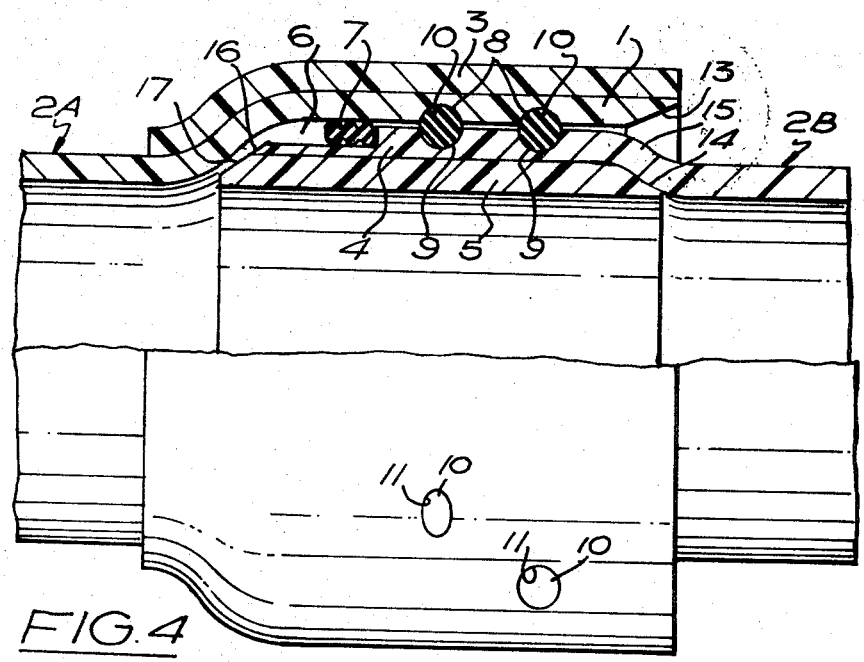

FIGS. 3 and 4 correspond to FIG. 1 but show two other forms of pipe coupling according to the invention.

Figure 2:
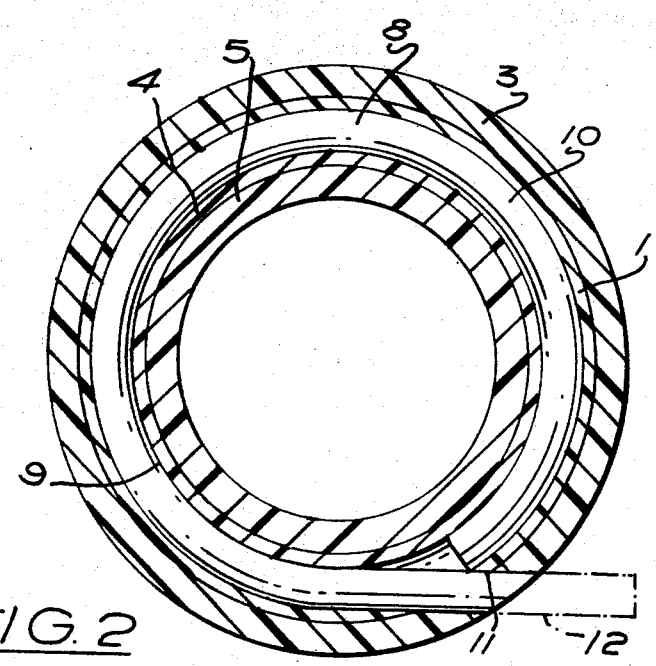
FIG. 2 is a section on the line 2–2 of FIG. 1.

In FIGS. 1 and 2 a socketed pipe-end 1 of a plastics pipe 2A, e.g., of polvinylchloride, has a collar 3 secured thereon, as by heating to the appropriate temperature and expanding it with the pipe-end or by shrink-fitting it on to the expanded pipe-end, and a spigoted pipe-end 4 of a plastics pipe 2B is expanded so as to be a close sliding fit in the socketed pipe-end, a sleeve 5 being secured inside the spigoted pipe-end, as by shrink-fitting, the spigoted pipe-end on to the sleeve. The spigoted pipe-end has a circumferential groove 6 housing a rubber sealing ring 7 having three ribs or lips both inside and outside to afford a corresponding number of seals with the pipe-ends 1, 4. A pair of circumferential grooves 8 inside the socketed pipe-end 1 mate with grooves 9 in the outside of the spigoted pipe-ends 4, and flexible rods 10, e.g., of polyvinylchloride, polyethylene, polypropylene, or nylon, are pushed into the mating grooves 8, 9 through tangential holes 11 in the collar 3 and the socketed pipe-end 1, and any excess 12 of rod may be trimmed off flush with the outside of the collar. Insertions of the flexible rods 10 may be assisted by use of a lubricant, e.g., castor oil, which may also be applied to the inside of the socketed pipe end 1 to assist fitting of the spigoted pipe-end in the socketed pipe-end. The ultimate end 13 of the socketed pipe-end 1 is bevelled internally, to assist compression of the sealing ring 7 and/or to assist initial insertion of the spigoted pipe-end 4 into the socketed pipe-end. The inner end 14 of the sleeve 5 is bevelled to match a taper 15 in the pipe 2B. The holes 11 for the flexible thrust rods 10 are staggered so as to avoid setting up any pronounced line of weakness along the collar 3 and the socketed pipe-end 1.

Any pull applied to either of the pipes 2A, 2B, such as is experienced when mole-ploughing the pipes into the ground, is transmitted through the rods 10 in the grooves 8, 9 in the pipe-ends 1, 4 and is not dependent upon the secureness of the collar 3 on the pipe 2A and of the sleeve 5 in the pipe 2B.

In FIGS. 3 and 4 like reference numerals represent like parts to FIGS. 1 and 2, the difference in FIG. 3 being that the ultimate end 16 of the spigoted pipe-end 4 is turned in over the adjacent bevelled end 17 of the sleeve 5, so as to increase the secureness of the sleeve and to provide a lead-in taper on the spigoted pipe-end. The bevelling of the ends 14, 17 of the sleeve 5 is similar, so that the sleeve can be inserted — before shrinking the spigoted pipe-end — either way round. In FIG. 4, the groove 6 is run out to the ultimate end 16 of the spigoted pipe-end 4, which along with the end 17 of the sleeve 5 is bevelled to assist insertion of the spigoted pipe-end 4 into the socketed pipe-end 1.

What I claim is:

1. A pipe coupling including mating first and second plastic pipes comprising:
   a flared socket on an end of said first pipe;
   a collar secured to the outside of said socket by shrink fitting, said collar providing additional material to increase the wall thickness of said socket for strength;
   a plurality of circumferential socket grooves on the inside of said flared socket;
   a flared spigot on an end of said second pipe, the outside diameter of said spigot being slightly less than the inside diameter of said socket, whereby said spigot slidingly mates with said socket;
   a sleeve secured to the inside of said spigot by shrink fitting said spigot about said sleeve, said sleeve providing additional material to increase the wall thickness of said spigot for strength;
   a plurality of first circumferential spigot grooves on the outside of said spigot, said spigot grooves positioned on said spigot to mate with said socket grooves when said spigot engages said socket, whereby a passageway is formed in the interface between said spigot and said socket, said passageway having an entrance, said entrance passing through both said collar and said socket;
   a second circumferential groove at the interface between said spigot and said socket;
   a sealing ring positioned in said second circumferential groove to provide sealing engagements between said pipes; and
   at least one thrust rod to lock said pipes together, said thrust rod being positioned in said passageway through said entrance.

2. The pipe coupling as recited in claim 1, wherein said second circumferential spigot groove is solely on the outside of said spigot.

3. A pipe coupling as in claim 1, wherein the ultimate end of the spigot is turned over the adjacent end of the sleeve.

4. A pipe coupling as in claim 3, wherein said adjacent end of the sleeve is bevelled externally.

5. A pipe coupling as in claim 4, wherein the other end of the sleeve is similarly bevelled.

* * * * *